Figure 1:
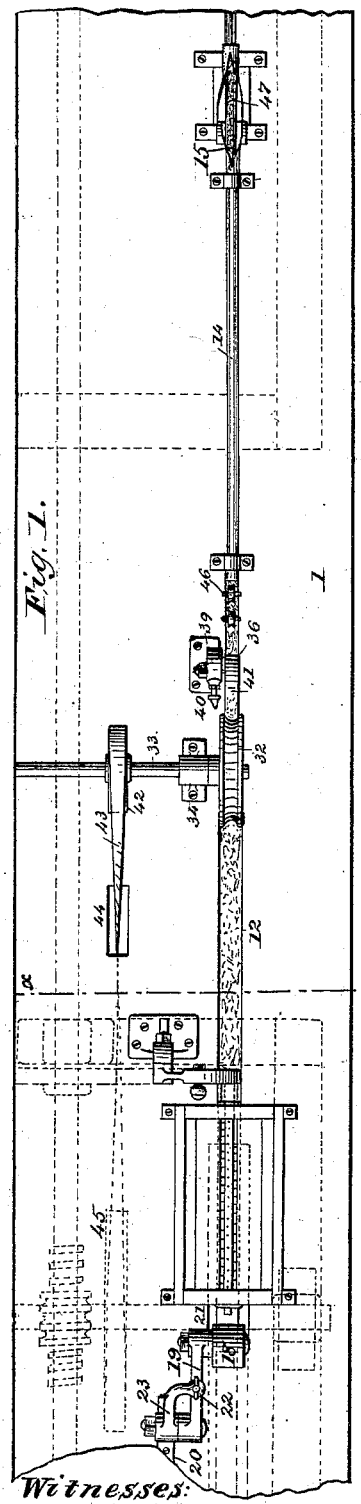

(No Model.) 8 Sheets—Sheet 1.

C. G. & W. H. EMERY.
Cigarette Machine.

No. 231,779. Patented Aug. 31, 1880.

Witnesses:
Jas. E. Hutchinson.
J. A. Rutherford

Inventors:
Chas. G. & Wm. H. Emery,
By James L. Norris,
Attorney.

N. PETERS, PHOTO-LITHOGRAPHER, WASHINGTON, D. C.

(No Model.) 8 Sheets—Sheet 2.
C. G. & W. H. EMERY.
Cigarette Machine.
No. 231,779. Patented Aug. 31, 1880.
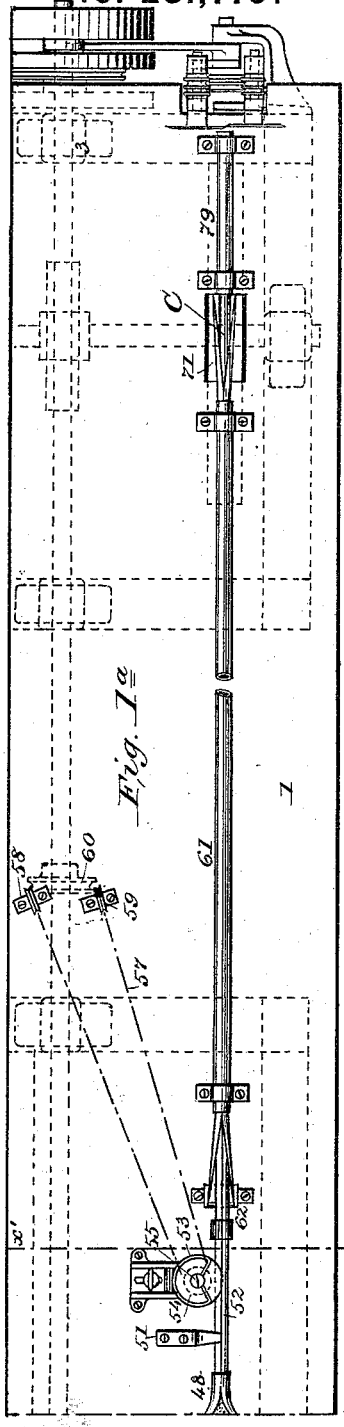
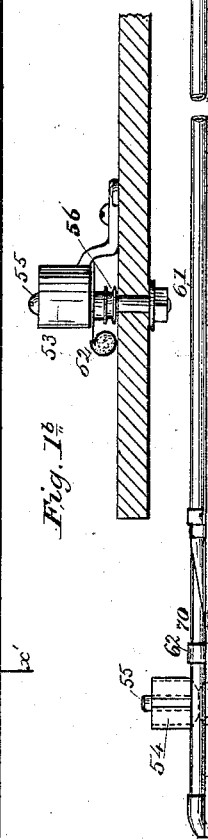
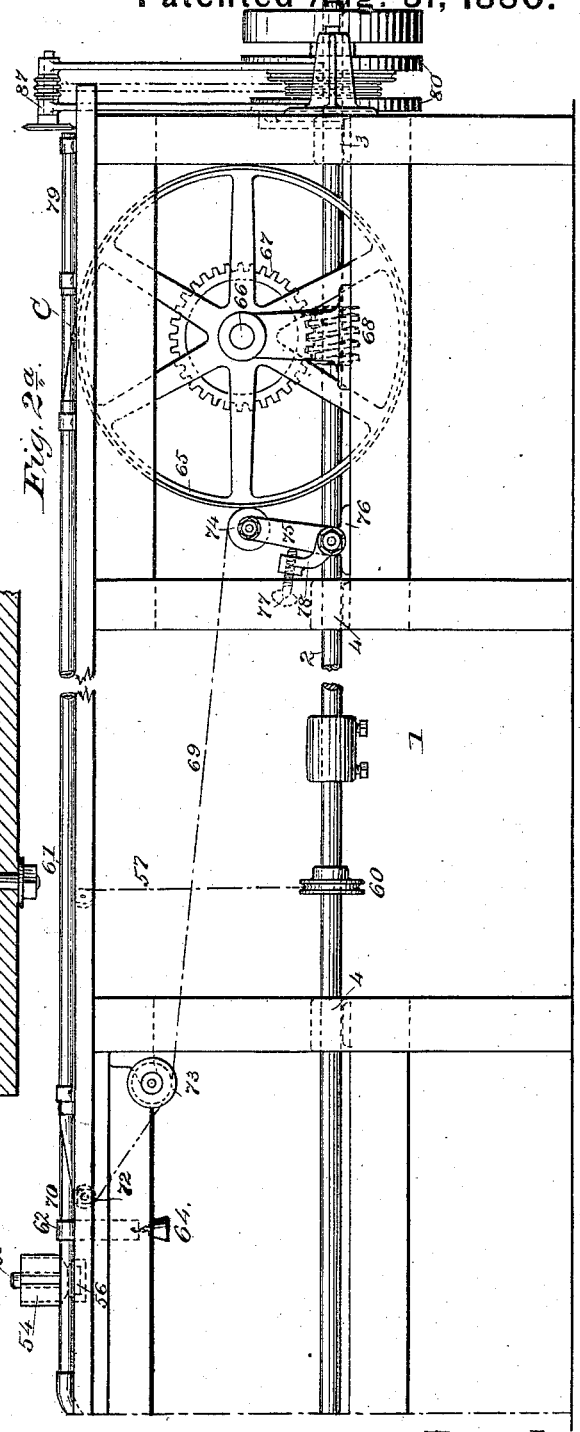
Witnesses:
Jas. E. Hutchinson.
J. A. Rutherford
Inventors:
Chas. G. & Wm. H. Emery,
By James L. Norris.
Attorney.
N. PETERS, PHOTO-LITHOGRAPHER, WASHINGTON, D. C.

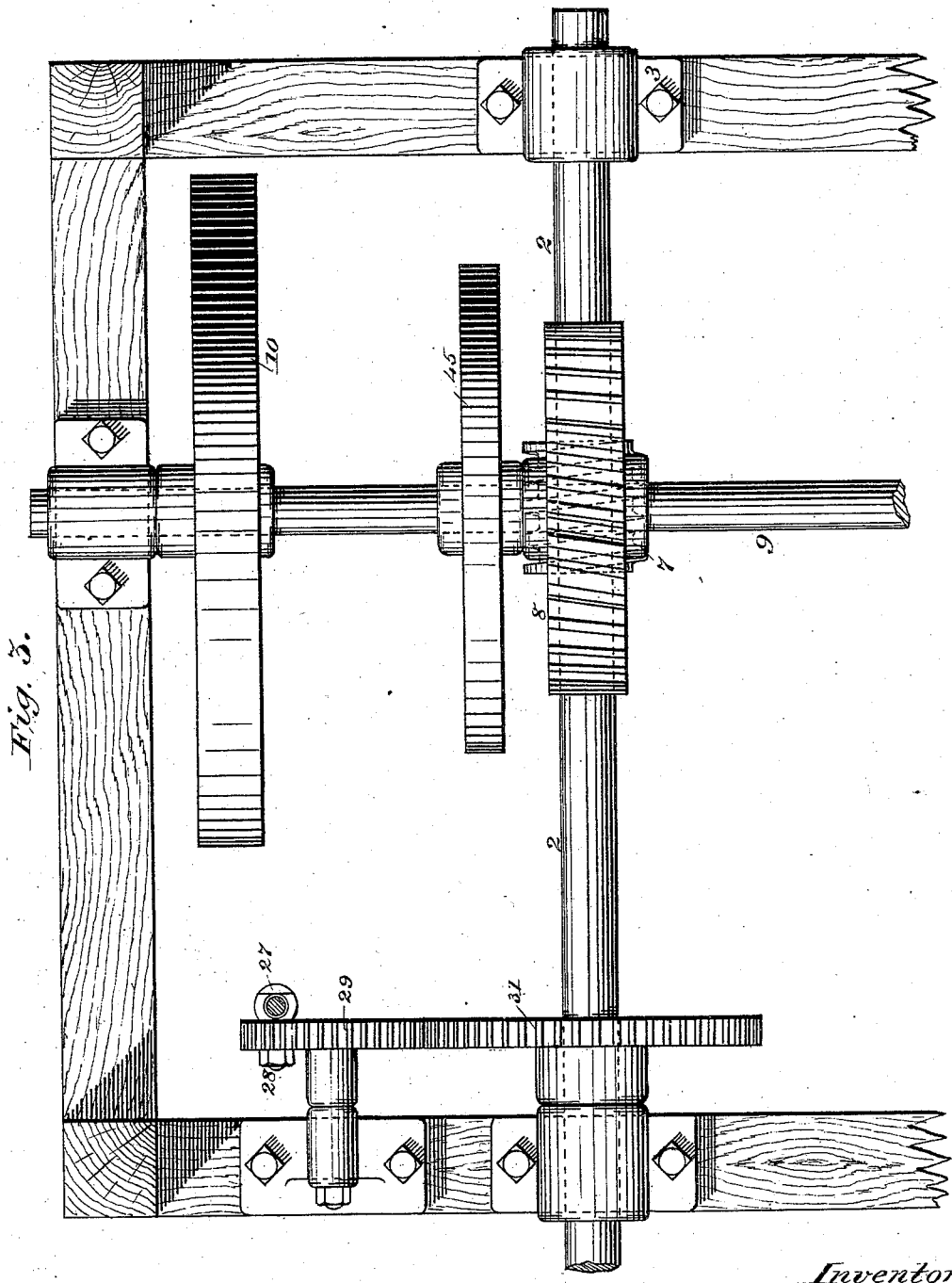

(No Model.)
C. G. & W. H. EMERY.
Cigarette Machine.
No. 231,779.        Patented Aug. 31, 1880.
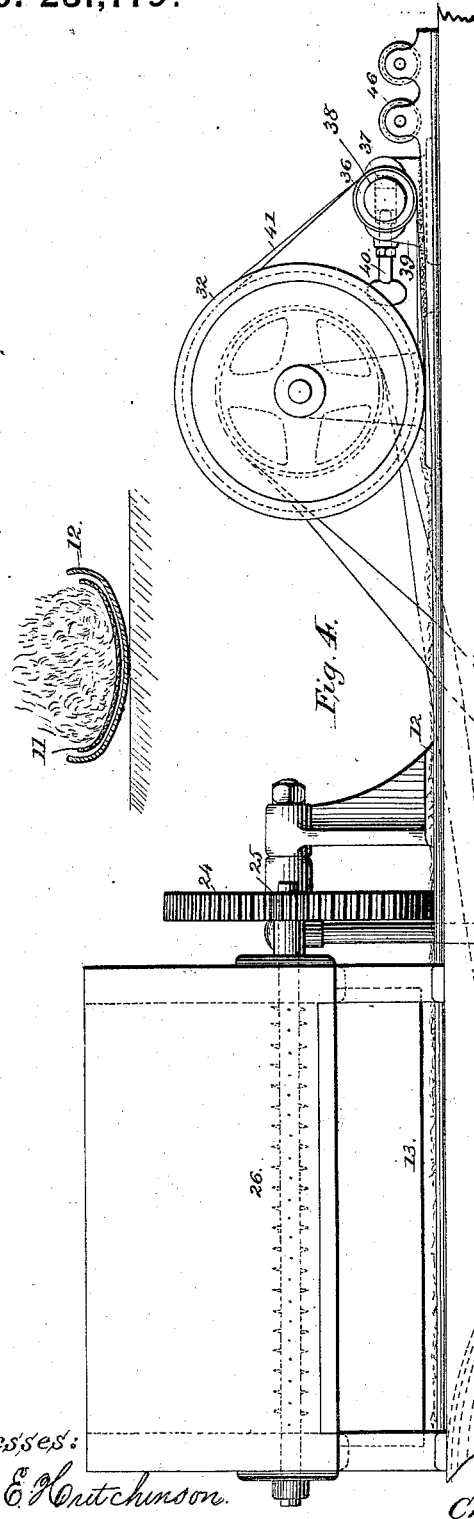
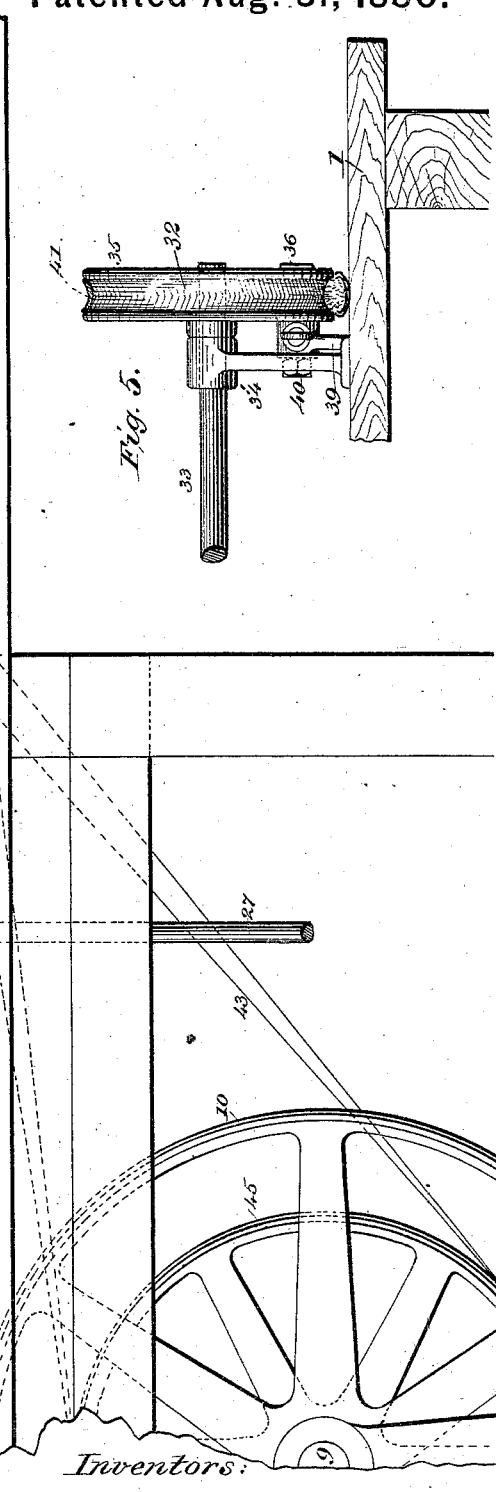
Witnesses:
Jas. E. Hutchinson.
J. A. Rutherford
Inventors:
Chas. G. & Wm. H. Emery.
By James L. Norris.
Attorney.

(No Model.) 8 Sheets—Sheet 5.
C. G. & W. H. EMERY.
Cigarette Machine.
No. 231,779. Patented Aug. 31, 1880.
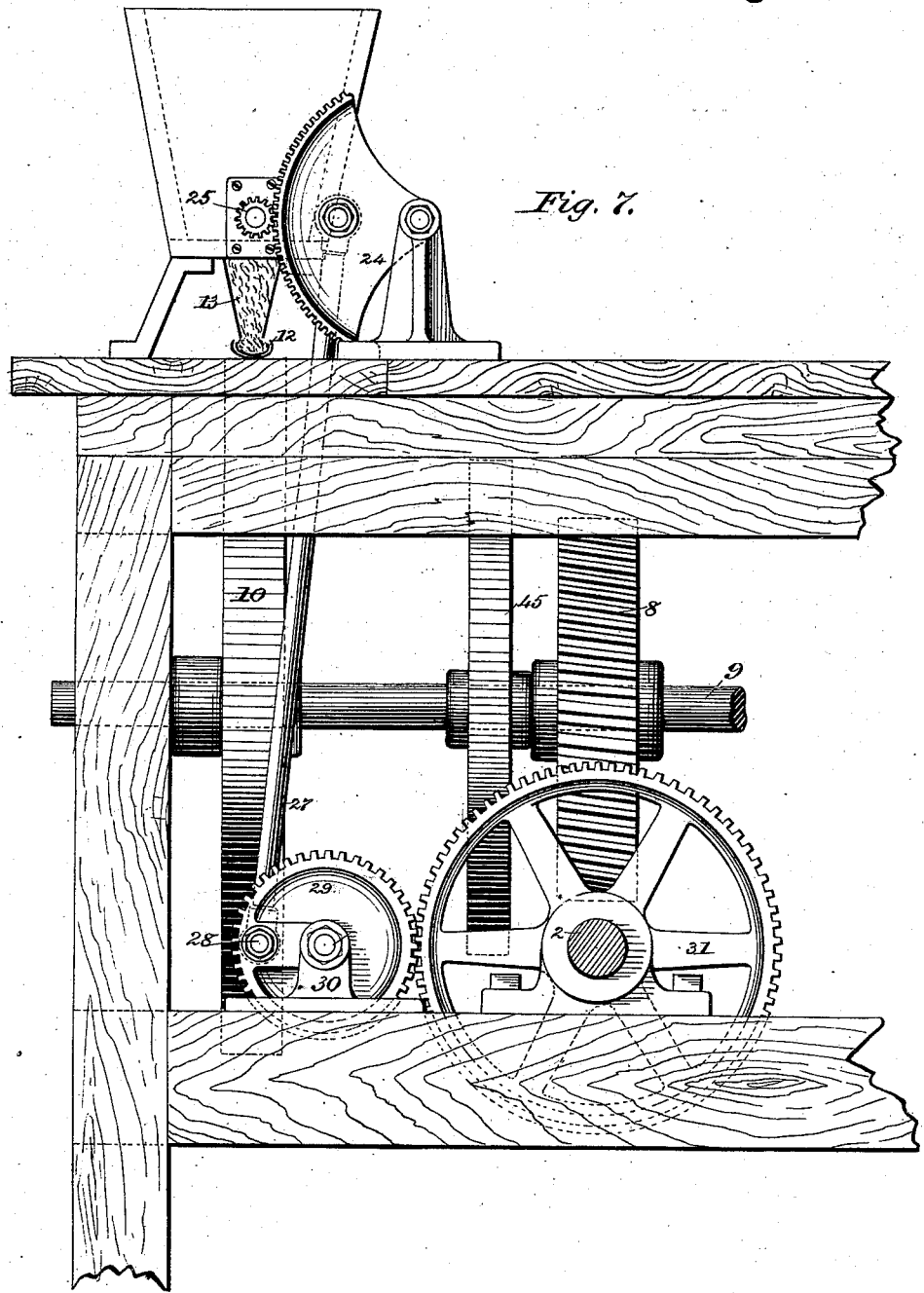

(No Model.)  
8 Sheets—Sheet 6.
C. G. & W. H. EMERY.
Cigarette Machine.
No. 231,779.  Patented Aug. 31, 1880.
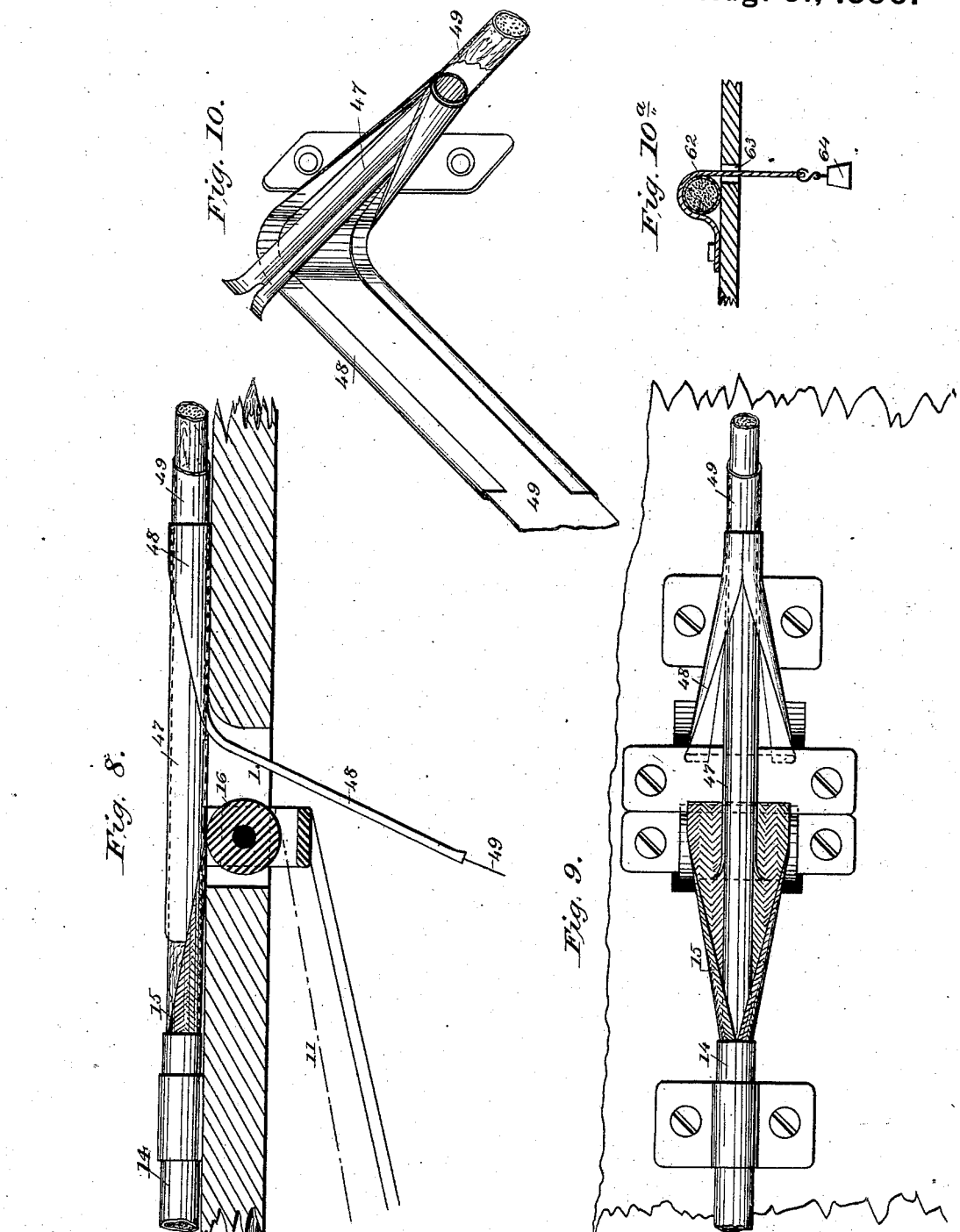
Witnesses:  
Jas. E. Hutchinson  
J. A. Rutherford
Inventors:  
Chas. G. & Wm. H. Emery,  
By James L. Norris,  
Attorney.

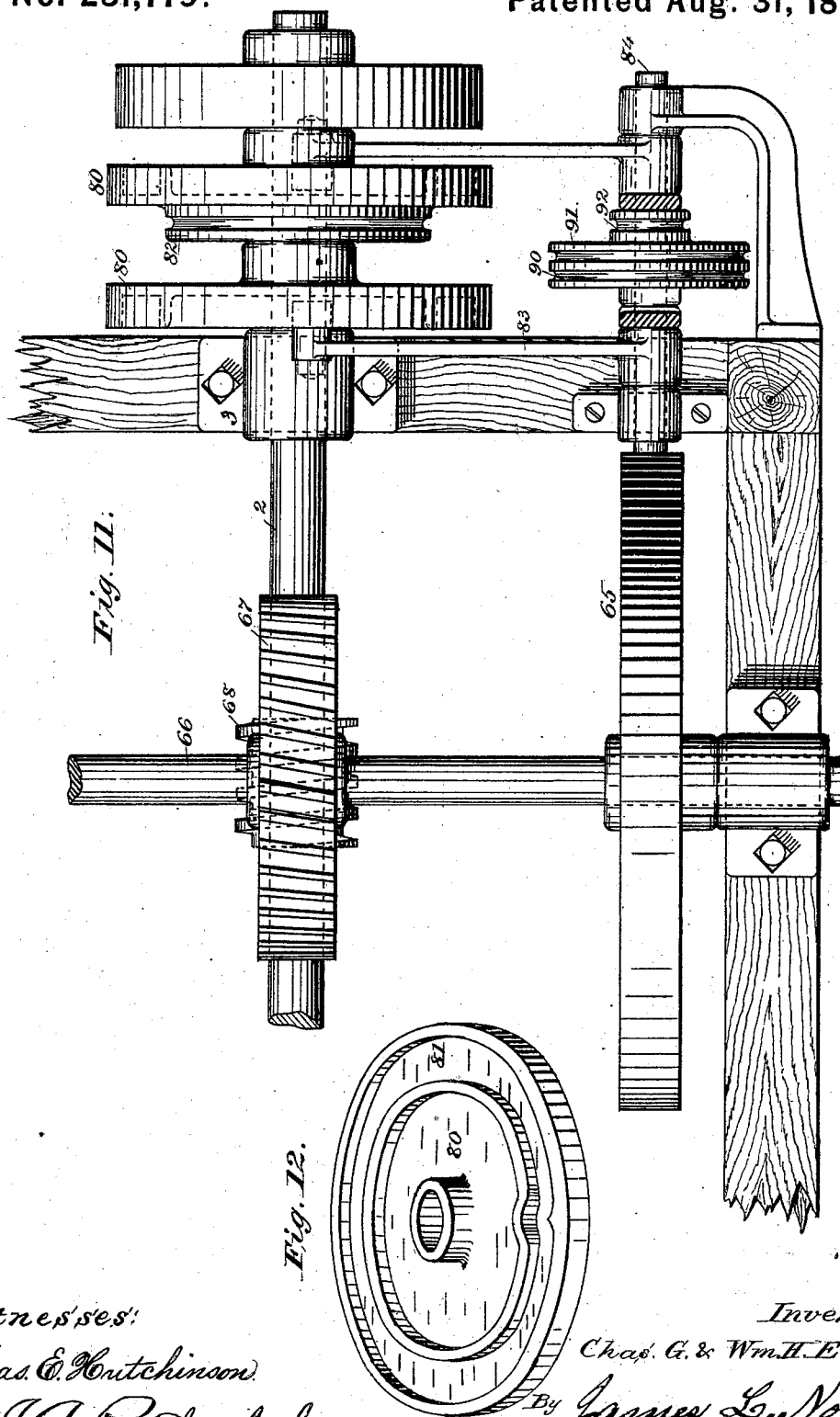

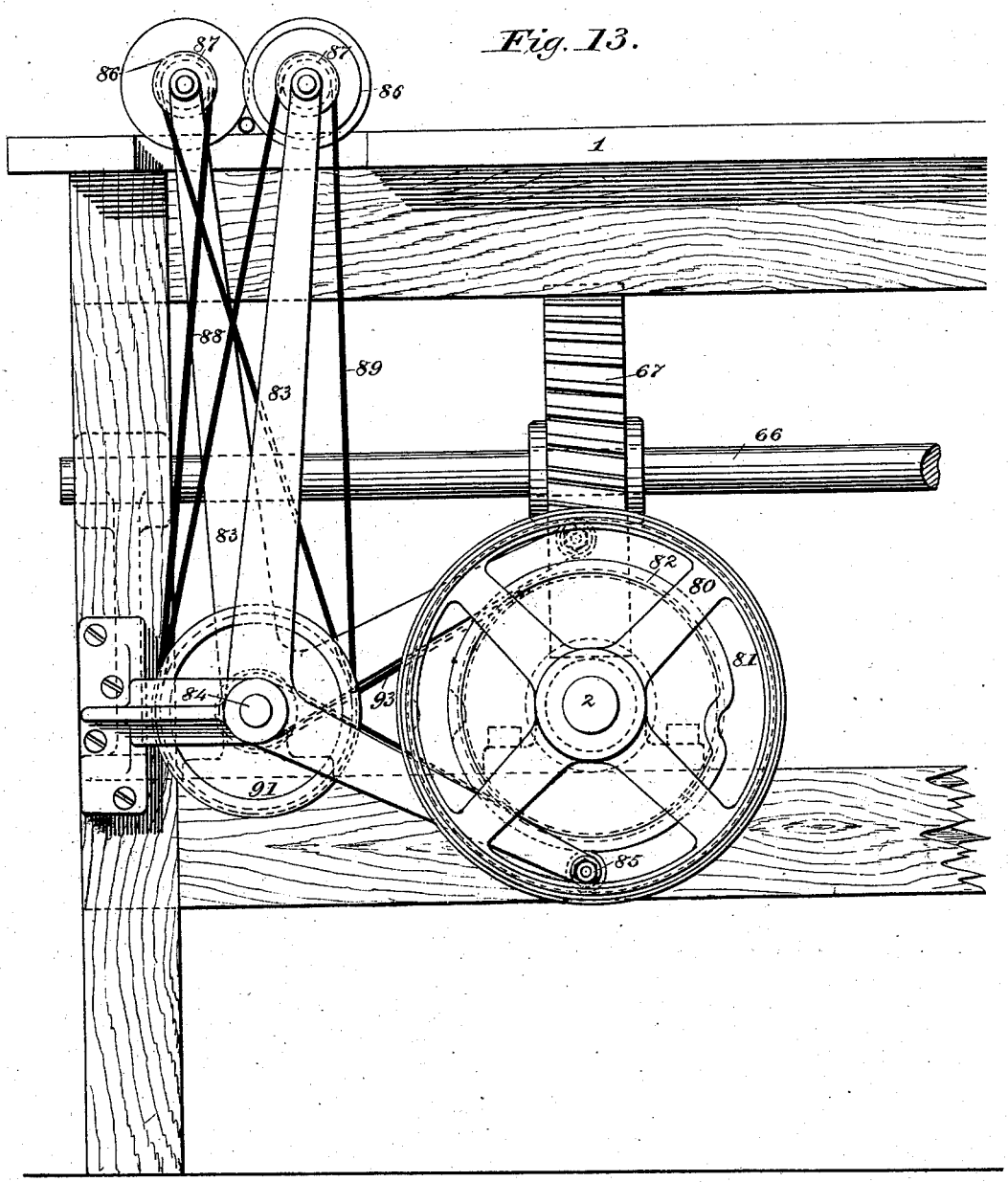

United States Patent Office.

CHARLES G. EMERY AND WILLIAM H. EMERY, OF BROOKLYN, NEW YORK; SAID WM. H. EMERY ASSIGNOR TO SAID CHAS. G. EMERY.

CIGARETTE-MACHINE.

SPECIFICATION forming part of Letters Patent No. 231,779, dated August 31, 1880.

Application filed May 5, 1880. (No model.)

*To all whom it may concern:*

Be it known that we, CHARLES G. EMERY and WILLIAM H. EMERY, citizens of the United States, residing at Brooklyn, in the county of Kings and State of New York, have invented new and useful Improvements in Cigarette-Machines, of which the following is a specification.

This invention relates to certain improvements upon the invention forming the subject-matter of Letters Patent of the United States granted to us the 3d day of June, 1879, No. 216,164, for improvement in cigarette-machines, in which loose tobacco is formed into a continuous filler and a continuous inclosing-wrapper applied around said filler and the overlapping edges of the same coated with cement, forming a continuous cigarette, which is fed forward and cut into suitable lengths by an automatically-operating machine.

The main features of said machine consist of a hopper for containing and delivering tobacco; a traveling belt for receiving tobacco from said hopper; a belt-curver or filler-chamber, whereby the belt is curved partially around the tobacco; a pressure-roller for packing the tobacco in the curved belt; a "filler-forming" tube for closing the belt around the tobacco; a device for opening out the belt after the filler is formed to release said filler; a bridge for supporting the filler as it is carried forward; a guide for conveying a continuous wrapper to the machine; a forming-chamber by means of which the wrapper is curved around the filler; a pasting device for applying cement to one edge of the wrapper; a chamber through which the endless traveling belt and the filler with the inclosing-wrapper pass to unite the pasted edges and carry the cigarette forward; a conductor for guiding the cigarette forward; and, finally, a cutting device for severing the cigarette into suitable lengths.

It is essential in such a machine that the filler-carrying belt shall be properly curved around the tobacco at the first stages of the operation, and that the various operating parts should work in unison, or in such relation with each other as to advance the continuous filler and wrapper and feed the cigarette to the cutters at uniform speed to prevent the continuity of the filler and cigarette from being destroyed while passing through the machine and sever the cigarette into uniform and equal lengths. It is also of the utmost importance, in order to produce a marketable article, that when cigarettes leave the machine the wrappers should be in pure unsoiled condition without any tobacco or other stains.

The object of the present invention is to insure the proper curving of the belt and a perfect unison of the movements of the various parts, as well as to simplify the construction and operation of the apparatus and to prevent the wrapper from becoming soiled by any possibility.

To this end the invention consists, first, in the combination, with the traveling filler-carrier belt of a cigarette-machine, of a longitudinal trough or guide extending under the hopper and forward to the compressing-roller, the said trough or guide being semi-elliptical in cross-section, or approximating thereto, whereby the belt is caused to assume a similar form to receive the tobacco, give it its initial form, and carry it forward without waste; second, in the combination, with the traveling belt and the trough or guide, of a pressure-roller having an angular or curved groove at its periphery and an adjustable pulley, the two carrying an endless belt moving positively and in unison with the filler-carrier belt and traveling a short distance above and in contact with the filler to curve the upper part and assist in feeding and compressing the same; third, in the combination, with the feed-pulleys, their endless belt, and the filler-carrier belt, of two small pressure-rollers located in advance of said feed-pulleys and belt, to compress the filler so that it will enter the filler-forming conductor; fourth, in the combination, with the trough or guide, the traveling belt, and the compressing and feed mechanism, of a filler-forming conductor through which the belt and filler are passed, whereby the filler is completely formed and fed forward; fifth, in the combination, with the mechanism for feeding and forming the cigarette-filler, of a curved conducting-bridge leading from the filler-forming conductor over the aperture through which the belt passes from the table into the paper-guide and to the end of the same, so as to deliver the filler into the wrapper as it is formed and prevent any particles escaping over the edges of the wrapper; sixth, in the combination, with the mechanism for forming and feeding the filler, of a paper-guide consisting of a flat strip of metal with guide-folds at the edges of its lower portion and gradually contracted into conical shape at its upper end, the said guide being bent at an angle and extended below through an aperture in the table, and adapted to receive a strip of paper from a reel below or other suitable carrier; seventh, in the combination, in a cigarette-machine, of the filler-forming mechanism and filler-carrier belt with suitable wrapper-forming mechanism and an independent cigarette-carrier belt, whereby all danger of soiling the wrapper of the cigarette during its formation is obviated; eighth, in the combination, with the filler-forming mechanism, the cigarette-carrier belt, and pasting mechanism, of a flexible smoother or buff adapted to press the edges of the wrapper together with a gentle yielding pressure to smooth out the wrapper and secure the edges; ninth, in the combination, with mechanism for forming and feeding the filler and the conductor through which the filler and wrapper pass during the operation of pasting, of an endless traveling belt and a guide-tube through which said belt passes, whereby the wrapper is secured around the filler to complete the continuous cigarette and said cigarette is fed forward; tenth, in the combination, with the driving-pulleys of the respective carrying-belts, of a longitudinal shaft journaled in bearings at the ends of the frame and provided with worm-gears meshing with cogged wheels on the shafts of the respective driving-pulleys, whereby a positive motion is imparted to each and they are caused to move in perfect unison; eleventh, in the combination, with the driving-pulleys of the respective carrying-belts, of a longitudinal shaft constructed in two parts, having an adjustable connection, and the gearing connecting said shaft with the shafts of the pulleys, whereby the mechanism may be adjusted to move the pulleys in proper unison; twelfth, in the combination, with the longitudinal shaft, of a cog-wheel mounted thereon and an intermeshing cog-wheel journaled in suitable bearings and provided with a pitman connected with the segment which operates the distributer in the hopper, whereby a positive motion is given to the distributer in unison with the other parts of the apparatus, in order to insure a uniform distribution of tobacco upon the filler-carrier belt; thirteenth, in the combination, with the longitudinal shaft, of two wheels provided with cam-grooves, and two angle-levers pivoted to the frame of the table and carrying at their upper ends rotary cutters, the lower ends being provided with friction-rollers setting in the cam-grooves, whereby the cutters are operated to sever the cigarette into proper and uniform lengths; fourteenth, in the combination, with the longitudinal shaft, of a grooved pulley mounted thereon, with a pulley mounted on the shaft to which the angle-levers are pivoted, and provided with three grooves and suitable grooved pulleys mounted on the cutter-shafts, the system of pulleys being connected by means of endless bands, whereby a rapid rotary motion is imparted to the cutters when the machine is in operation, in order to give a clean cut to the cigarette.

Figure 2:
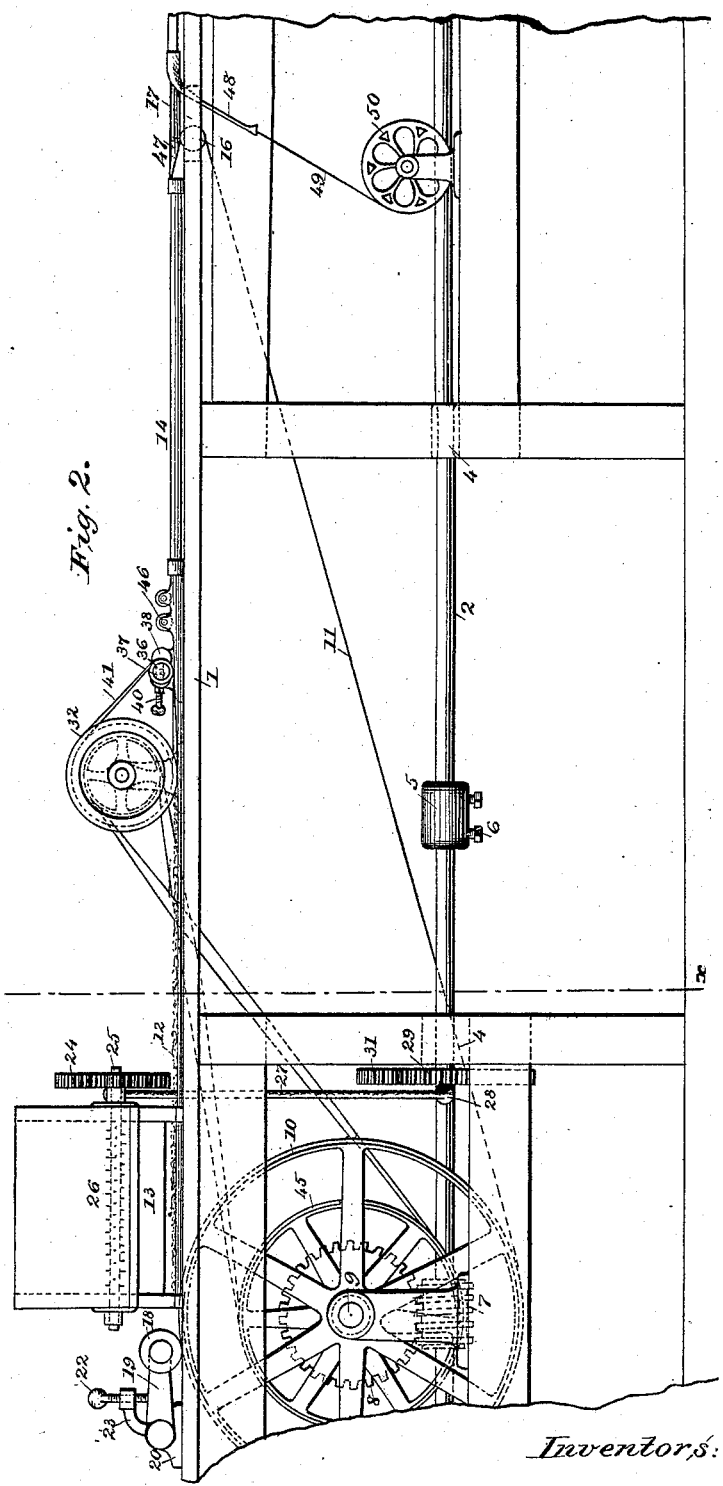

In the drawings, Figures 1, Sheet 1, and 1$^a$, Sheet 2, represent top views of our improved machine, portions of the machine being represented by dotted lines. Fig. 1$^b$ is a section on line $x'$ $x'$. Figs. 2, Sheet 1, and 2$^a$, Sheet 2, represent a side elevation with portions in dotted lines. Fig. 3 represents an enlarged top view of the forward portion of the table with the top of the same removed, showing the longitudinal or main driving-shaft, the shaft carrying the driving-pulley of the filler-carrying belt with the mechanism for operating the same, and the segment which operates the distributing mechanism of the hopper. Fig. 4 represents an enlarged view, in side elevation, of the forward portion of the machine, showing the hopper, distributing mechanism, trough, and feed and compressing mechanism. Fig. 5 represents a detached front view of the feed and compressing mechanism. Fig. 6 represents a detached view, in cross-section, of the top of the table, showing the trough or guide and the filler-carrying belt with the tobacco distributed therein from the hopper. Fig. 7 represents an enlarged view, in transverse section, on the line $x$ $x$ of Figs. 1 and 2. Fig. 8 represents an enlarged longitudinal sectional view of that portion of the table through which the filler-carrier belt passes after forming the filler, showing the paper-guide and bridge for conveying the filler into said guide. Fig. 9 is an enlarged top view of the table and last-mentioned parts. Fig. 10 represents a detached perspective view of the paper-guide and conveying-bridge enlarged. Fig. 10$^a$ indicates a transverse sectional view, showing the flexible buff-smoother. Fig. 11 represents an enlarged top view of the rear portion of the machine with the top of the table removed, showing a portion of the mechanism for operating the cigarette-carrier belt and a portion of the mechanism for operating the revolving cutters. Fig. 12 represents a detached perspective view of one of the cam-grooved wheels by which the angle-levers carrying the rotary cutters are operated; and Fig. 13 represents a rear elevation of the machine, showing the mechanism for operating the cutters.

The number 1 indicates a table constructed of any suitable material, and carrying the working parts of our improved apparatus; and 2 indicates a longitudinal main driving-shaft journaled in bearings 3 (shown in Figs. 2$^a$, 3, and 11) in the frame of the table at each end of the same, and in intermediate journals, 4. The said shaft is preferably constructed in two parts, which are provided with an adjustable connection, 5, having binding-screws 6, for the purpose more fully hereinafter specified. No. 7 indicates a worm mounted on the main driving-shaft 2 near its forward end, and gearing into a wheel, 8, provided with oblique cogs on its periphery. The said wheel is mounted on the transverse shaft 9, carrying the large driving-pulley 10, which gives motion to the filler-carrier belt 11.

The number 12 indicates the trough or filler-belt guide, which is semi-elliptical in cross-section, as indicated in Fig. 6, and is located upon the table, extending from its front or near the same longitudinally under the delivery-spout 13 of the hopper, and from thence forward upon the frame, until it passes the feed and pressure roller, more fully hereinafter described, where it is gradually contracted, connecting at its contracted end with a filler-forming conductor, 14. The filler-carrier belt extends forward through the trough, being curved by the same to correspond with its outline in cross-section, and is gradually contracted and passed through the filler-forming conductor 14, which opens out laterally at its delivery end 15, so as to permit the belt to expand laterally and flatten itself out as it emerges from said conductor.

The number 16 indicates a transverse roller journaled in an opening, 17, in the top of the table, over which the filler-carrier belt passes on its return to the driving-pulley.

The number 18 indicates a roller mounted at the end of a bent lever, 19, which is pivoted to a bearing, 20, secured to the top of the table at one side of the forward opening, 21, through which the filler-belt passes on its forward course.

The number 22 indicates a set-screw mounted in a bracket, 23, by means of which the roller may be pressed upon the belt 11 to force it into contact with the pulley 10 and insure its movement without possibility of slipping.

The number 24 indicates the cog-segment which gives motion to the pinion 25 of the distributer 26 in the hopper. This segment and pinion are the same as described in the original patent granted to us, before mentioned. To the segment is pivoted a connecting-rod, 27, extending through an opening in the table below and connecting at its lower end with a crank-pin, 28, on the cog-wheel 29, which is journaled to a standard, 30, on the frame of the machine.

The number 31 indicates a cog driving-wheel intermeshing with the wheel 29 and journaled on the main driving-shaft, by means of which an intermittent movement is given to the segment 24, and through it to the distributer, to distribute the tobacco upon the filler-carrier belt.

The number 32 indicates a roller mounted on a transverse shaft, 33, journaled in bearings 34 in standards mounted on the top of the table. The said roller 32 is provided with an angular or curved groove, 35, at its periphery, which may be corrugated, as shown in Fig. 5 of the drawings, the roller being located directly over the filler-belt trough or guide at the point where it begins to be contracted.

The number 36 indicates a pulley journaled upon a shaft secured to an adjustable block, 37, located in a guide-slot, 38, in the standard 39, secured to the top of the table at one side of filler-belt trough.

The number 40 indicates a set-screw by means of which the block 37 may be adjusted.

From the roller 32 to the pulley 36 extends an endless belt, 41, the two rollers being so located with respect to each other and the filler-carrier belt and trough that the lower portion of belt 41 will travel over the tobacco and in contact with the same as it is carried along by the filler-carrier belt through the gradually-contracted part of the filler-belt trough or guide, and by reason of the curving of the belt 41, caused by the gradual contraction of the trough and filler-carrier belt, will gradually compress the tobacco into cylindrical form.

The shaft 33, Fig. 1, has mounted on it a pulley, 42, which connects by means of a crossed belt, 43, extending through an opening, 44, in the table, with and running around the wheel 45 on the shaft 9, by means of which motion is given to the wheel 32.

The number 46 indicates two small rollers journaled in suitable bearings, and adapted to press upon the tobacco in the filler-carrier belt just previous to its entrance to the filler-forming conductor 14, by means of which the tobacco is packed as the belt 11 is closed around the tobacco, preventing the escape of the tobacco, which would otherwise be apt to occur.

The number 47 indicates a curved bridge extending from within the diverging end of the conductor 14 across the opening 17 and into a gradually-contracting guide, 48, by means of which the paper wrapper 49 is conducted to the filler.

The bridge 47 is formed of a sheet-metal strip curved to have about a semicircular shape in cross-section, and is wide enough to permit the filler to pass freely. Its end within the flaring end of guide 14 is soldered thereto, but at its other end is loose in the guide 48, so that the paper may pass freely under it. The said guide 48 consists of a metallic strip folded at its edges, as shown, to form guide-grooves at each side for the edges of the paper strip. The upper end of said strip is bent at right angles, or thereabout, as shown in detail in Figs. 8 and 10 of the drawings, and is gradually contracted toward its upper end, the lower end extending down through the opening 17 in the top of the table. At the upper end of the strip the guide-lips are curved the same as the body portion, upon which they are lapped, and thus form inner curved walls, between which and the outer wall or body portion the paper is folded into tubular form as it passes, as illustrated in Fig. 10. The edges of the tubular end of the guide may slightly lap each other, so that the edges of the paper will lap correspondingly as it emerges.

The number 50, Fig. 2, indicates a reel mounted on a shaft journaled in suitable standards and carrying paper strip 49 wound into a roll. The paper from the reel passes up through the guide 48, and is gradually brought into cylindrical shape, and at the same time wrapped around the continuous filler.

In proximity to the outlet of the bent guide 48 is a flexible finger, 51, passing between the two edges of the paper tube or wrapper for keeping the edges of the wrapper separated, compressing and holding the lower or inner edge upon the filler, guiding and holding it in proper form. The filler with its wrapper is then conducted into a conductor, 52, the edges of which overlap each other, as shown in cross-sectional view, Fig. 1$^b$, so as to leave an intervening space between said edges of sufficient size for the passage of one edge of the projecting paper or wrapper.

The number 53 indicates a pasting-disk located in such manner with respect to the chamber 52 that said disk will have its edges during rotation between the two lapping marginal edges of the wrapper. Rotary motion is imparted to said disk, which revolves under the paste-reservoir 54, and forms the bottom thereof in any suitable manner, so as to take up and deliver a sufficient and uniform quantity of the paste to the edge or edges of the wrapper. The pasting-disk is mounted on an upright journal, 55, and is rotated thereon by means of a pulley, 56, around which is carried an endless band, 57, passing over pulleys 58 and 59, Fig. 1$^a$, Sheet 2, down through the table and around a pulley, 60, on the driving-shaft 2.

The rear end of the conductor 52 extends within but is not attached to the forward end of the flaring or bell-mouth conductor 61, so as to deliver the filler with the wrapper surrounding the same into said conductor.

Just in advance of the pasting device is located a flexible buff-smoother, 62, consisting of a piece of soft leather, such as chamois-skin or other suitable material, secured to the table at one side of the cigarette and extending through an opening, 63, in the table, the free end being provided with a small weight, 64, by which a gentle pressure is brought to bear upon the cigarette to smooth the wrapper and join its edges.

The number 65 indicates a driving-pulley mounted on a transverse shaft, 66, journaled in suitable bearings in the frame of the machine. The said shaft is provided with a cog-gear, 67, intermeshing with a worm, 68, on the driving-shaft 2, the pulley, cog-wheel, and worm being precisely similar to the driving-pulley, cog-wheel, and worm for operating the filler-carrier belt before mentioned.

The number 69 indicates a belt, which may be termed a "cigarette-carrier" belt, extending through the conductor 61 and downward through the apertures 70 and 71 in the table, around the pulley 65 and the small pulleys 72 and 73. The driving-pulleys and operating mechanism of the respective bolts—that is, the filler-carrier bolts—being precisely identical in size and arrangement, it is evident that the two belts will be moved in perfect unison with each other.

The number 74 indicates a roller mounted upon a lever, 75, fulcrumed to the frame at 76, and 77 a set-screw extending through a bracket, 78, back of the lever 75, by means of which the belt 69 may be pressed into contact with the pulley 65, to insure said belt being positively carried by the pulley without any possibility of slipping.

The cigarette-carrier belt is curved upon entering the conductor 61 and compressed around the cigarette, uniting its pasted edges, and feeding it forward, in a completed condition, to a guide or conductor, 79, from which the continuous cigarette is finally discharged from the machine. The letter C, Figs. 1$^a$ and 2$^a$, indicates the cigarette passing from conductor 61 to guide 79.

The number 80 indicates two wheels or disks mounted on the main driving-shaft at the projecting rear end of the same. The said disks or wheels are provided with cam-grooves 81. Upon the shaft, between the two cam-grooved wheels, is mounted a grooved pulley, 82.

The number 83 indicates two angle-levers mounted on a shaft, 84, secured to the frame of the table and to a suitable bracket, also secured to the frame of the table. The lower ends of said levers are provided with friction-rollers 85, which set in the cam-grooves 81, and the upper ends carry the rotating cutters 86, the levers and cams being so arranged relatively as to move the cutters together at proper intervals to sever the continuous cigarette into equal and uniform lengths as it is fed through the conductor 79.

The cutter-shafts are provided with grooved pulleys 87, which are connected, by endless bands 88 89, with the grooves 90 in a pulley, 91, mounted on the shaft 84 between the angle-levers, the said pulley being provided with a groove, 92, which connects, by an endless band, 93, with the pulley 82, whereby a rapid rotary motion is imparted to the rotary cutters.

The operation of our improved machine is as follows: Long-cut tobacco, which has been drawn or impregnated with moisture several hours before, is deposited in the hopper, being thrown light in and evenly distributed, so as not to pack, to bring the weight of the top of the mass on the lower portions of the same. The working parts of the machine having been set in motion, the distributer, being operated by positive mechanism, will distribute the tobacco in uniform quantities upon the filler-carrier belt as it moves through the semi-elliptical trough or guide, partially curving the belt around the tobacco, so as to carry it without waste, and begin the initial formation of the filler.

The trough 12, it will be borne in mind, is of semi-elliptical shape in cross-section, as shown in Fig. 6, from its end under the hopper to the point where it begins to contract under wheel 32, so that the tobacco is prevented from falling off the belt. As the belt passes forward under the grooved roller 32 and belt 41 the tobacco is seized and fed forward, and its upper surface is pressed into shape approximating the shape of the lower surface, or, in other words, the tobacco is caused to assume an elliptical shape in cross-section as it passes under said belt 41 by reason of the curved form given to the belt by passing over the curved periphery of the roller 32, and the gradually-contracted extremity of the trough reduces it to cylindrical form, and the rollers 46 compress it on its way to the conductor 14, so that it may enter the same freely without waste. On its passage through said conductor the belt 11 is caused to completely encircle the tobacco, completing the filler, which emerges from the flaring mouth 15 of said conductor 14 in a condition sufficiently solid to be projected without breaking in its onward course through the curved bridge 47 and the paper-guide 48. Here it meets with the strip of paper 49, which is curved up through said guide, and by means of the contracted upper end of said guide is enveloped by the traveling strip of paper. The filler and its inclosing-wrapper then pass through the wrapper, being supplied with paste at one or both edges by the pasting-disk 53, after which the filler and inclosing-wrapper are carried by the belt 69 through the conductor 61. Previous to passing into the conductor 61 the filler and wrapper pass through the smoother 62, by which the whole is gently compressed, so as to smooth the paper and unite the cemented edges. The continuous cigarette, after passing through the conductor 61, is fed onward through the conductor or guide 79 to the cutters 86, which are operated by the before-mentioned mechanism to approach each other at proper intervals to sever the cigarette into equal and uniform lengths.

What we claim is—

1. The combination, with the traveling filler-carrier belt of a cigarette-machine, of a longitudinal trough or guide extending under the hopper and forward to a compressing-roller, the said trough or guide being semi-elliptical in cross-section, or approximating thereto, whereby the belt is caused to assume a similar form to receive the tobacco, give it its initial form, and carry it forward without waste, substantially as specified.

2. In combination with the traveling filler-carrying belt and the curved trough or guide, a grooved pressure-roller and a pulley mounted on an adjustable journal provided with adjusting mechanism, the roller and pulley being connected by an endless band adapted to travel a short distance in contact with the filler to curve the upper part and assist in feeding and compressing the same, substantially as specified.

3. In combination with the feed-pulleys, their endless connecting-belt, and the filler-carrier belt and the trough, the two small pressure-rollers located in advance of the feed-pulleys to compress the tobacco before entering the filler-former chamber, substantially as specified.

4. In combination with the trough or guide, the traveling filler-carrying belt, and compressing and upper feed mechanism, a filler-forming tube, through which the belt and filler are passed, whereby the filler is completely formed and fed forward.

5. In combination with the mechanism for feeding and forming the cigarette-filler, a curved conducting-bridge, 47, leading from the filler-forming conductor over the aperture through which the carrying-belt passes from the table into a guide, through which the paper or wrapper passes to be applied to the filler.

6. In combination with the mechanism for feeding and forming a filler, a paper-guide consisting of a flat strip of metal having guide-lips folded at its edges and gradually contracted into conical tubular shape at its upper end, its lips being curved longitudinally, the same as the body portion of the strip, and forming curved inner walls, between which and the outer portion of the strip is a passage for the paper, substantially as described, and for the purpose set forth.

7. In combination, in a cigarette-machine, the filler-forming mechanism and filler-carrier belt, with suitable wrapper-forming mechanism and an independent wrapper-carrier belt, whereby all danger of soiling the wrapper is obviated during the formation of a cigarette.

8. In combination with the filler-forming mechanism, wrapper-carrying belt, and pasting mechanism, a flexible smoother or buffer adapted to press the edges of the wrapper together with a yielding pressure to smooth out the wrapper and secure its edges.

9. In combination with the mechanism for feeding and forming the filler and the conductor through which the feeder and wrapper pass during the operation of pasting, an endless cigarette-carrier belt, 69, and conducting-tube 61, through which said belt passes, whereby the wrapper is secured around the filler to complete the continuous cigarette and said cigarette is fed forward, substantially as specified.

10. In combination with the driving-pulleys of the respective carrying-belts, a longitudinal shaft, journaled in suitable bearings and provided with worm-gears meshing with cog-wheels on the shafts of the driving-pulleys, whereby a positive motion is imparted to each and they are caused to move in perfect unison.

11. In combination with the longitudinal shaft, curved carrying-belt 12, and intermediate connecting devices, a cog-wheel mounted on said shaft, and an intermeshing cog-wheel journaled in suitable bearings and provided with a pitman connected with the segment 24, and cog-wheel 25, mounted on the rock-shaft of the distributer in the hopper, whereby a positive motion is given to the distributer in unison with said belt, in order to secure a uniform distribution of the tobacco upon the filler-carrying belt, substantially as specified.

12. The combination, with the longitudinal shaft, of two wheels provided with cam-grooves, and two angle-levers, pivoted to the frame of the table and carrying at their upper ends rotary cutters, their lower ends being provided with friction-rollers setting in the cam-grooves, whereby the cutters are operated to sever the continuous cigarette into proper and uniform lengths, substantially as specified.

In testimony whereof we have hereunto set our hands in the presence of two subscribing witnesses.

CHARLES G. EMERY.
WILLIAM H. EMERY.

Witnesses:
JOHN D. LITTLE,
HENRY HENJES.